(12) United States Patent
Lee et al.

(10) Patent No.: US 7,356,080 B2
(45) Date of Patent: Apr. 8, 2008

(54) MPEG-4 ENCODER USING H.263 MULTIMEDIA CHIP

(75) Inventors: Hyun-Seung Lee, Suwon-si (KR); Ji-Ho Park, Seoul (KR); Dae-Kyu Shin, Seoul (KR); Seung-Cheol Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 734 days.

(21) Appl. No.: 10/702,745

(22) Filed: Nov. 6, 2003

(65) Prior Publication Data
US 2005/0025373 A1 Feb. 3, 2005

(30) Foreign Application Priority Data
Jul. 30, 2003 (KR) ............ 10-2003-0052623

(51) Int. Cl.
*H04B 1/66* (2006.01)
*H04N 7/12* (2006.01)
*H04N 11/02* (2006.01)
*H04N 11/04* (2006.01)

(52) U.S. Cl. ............ 375/240.03; 375/240.08; 375/240.12; 375/240.13; 375/240.23

(58) Field of Classification Search ........... 375/240.03, 375/240.23, 240.12, 240.08, 240.24, 240, 375/240.13
See application file for complete search history.

(56) References Cited

U.S. PATENT DOCUMENTS 5,237,424 A * 8/1993 Nishino et al. ............. 386/40
6,343,098 B1 * 1/2002 Boyce ................. 375/240.03
6,826,229 B2 * 11/2004 Kawashima et al. ... 375/240.03
2004/0057521 A1 * 3/2004 Brown et al. .......... 375/240.25

OTHER PUBLICATIONS

Lee, Wee Sun et al. "A Robust codec for Transmission of Very Low Bit-Rate Video over Channels with Bursty Errors". IEEE Transactions on Circuits and Systems for Video Technology, vol. 10, No. 8, Dec. 2000, pp. 1403-1412.*

* cited by examiner

*Primary Examiner*—Marsha D. Banks-Harold
*Assistant Examiner*—Chikaodili E Anyikire
(74) *Attorney, Agent, or Firm*—The Farrell Law Firm, PC

(57) ABSTRACT

An MPEG-4 encoder utilizing an H.263 multimedia chip. The MPEG-4 encoder includes a DC (Direct Current) predictor for predicting a DC component of the image frame encoded by an H.263 standard upon receiving a prescribed MPEG-4 quantization value, and an MPEG-4 reconstruction image memory for converting the H.263 reconstruction image into an MPEG-4 reconstruction image, and storing the MPEG-4 reconstruction image. The MPEG-4 encoder removes spatial redundancy from source image data entered in frame units using a prescribed H.263 quantization value, predicts a DC component of an image frame having no spatial redundancy using a prescribed MPEG-4 quantization value, performs a VLC (Variable Length Coding) process on the image frame using the predicted DC component, and outputs the VLC-processed image frame in the form of an MPEG-4 bit stream. The MPEG-4 encoder reconstructs the image frame having no spatial redundancy, stores the reconstructed image frame, converts the reconstructed image frame into an MPEG-4 frame, stores the MPEG-4 frame, compares the stored image frame with a newly-entered next frame, and removes temporal redundancy according to a result of the comparison.

4 Claims, 4 Drawing Sheets

MPEG-4 ENCODER USING H.263 MULTIMEDIA CHIP

PRIORITY

This application claims priority to an application entitled "MPEG-4 ENCODER USING H.263 MULTIMEDIA CHIP", filed in the Korean Intellectual Property Office on Jul. 30, 2003 and assigned Serial No. 2003-52623, the contents of which are hereby incorporated by reference.

BACKGROUND OF THE INVENTION

1. Field of the Invention

The present invention relates generally to an MPEG (Motion Picture Experts Group)-4 encoder, and more particularly to an MPEG-4 encoder using an H.263 multimedia chip.

2. Description of the Related Art

Many developers of next generation mobile phone have conducted intensive research into a new technique for connecting a variety of applications with the mobile phone (i.e., a mobile terminal) to satisfy a variety of user desires. Particularly, most of users have a great interest in a video communication function (i.e., a video phone function) and a camcorder function. Therefore, a production company or manufacturer of the mobile terminal must implement an H.263 encoder and an MPEG-4 encoder that serve as an international standard in the mobile terminal. Typically, an H.263 encoder performs a video communication function, and the MPEG-4 encoder creates a moving image such as a video image of a camcorder.

The H.263 encoder and the MPEG-4 encoder can be implemented via software or hardware systems in the mobile terminal. However, the software implementation method has limitations in providing a user with a high-speed communication service matched with the user's request, and the hardware implementation method has a disadvantage in that it unavoidably increases the cost, size, and complexity of a chip.

Therefore, the company or manufacturer of the mobile terminal currently implements the H.263 and MPEG-4 encoders in the mobile terminal using all of the software and hardware implementation methods. For example, companies or manufacturers may employ a hardware implementation of the H.263 encoder for a video communication function, or may employ a software implementation of the MPEG-4 encoder. However, the MPEG-4 encoder consumes a much larger load than the H.263 encoder in performing a DCT (Discrete Cosine Transform) process, a motion estimation process, and a motion compensation process, such that the software-implemented MPEG-4 encoder unavoidably performs a video coding process at a very low speed.

SUMMARY OF THE INVENTION

Therefore, the present invention has been designed in view of the above problems, and it is an object of the present invention to provide an MPEG-4 encoder for improving a camcorder-phone performance to effectively store a moving image in the camcorder phone, and a method for controlling the same.

It is another object of the present invention to provide an MPEG-4 encoder for enhancing an encoding speed of a camcorder phone, and a method for controlling the same.

It is yet another object of the present invention to provide an MPEG-4 encoder, which is implemented using only a typical hardware block without using an additional hardware block requiring an additional cost, and a method for controlling the same.

It is yet a further object of the present invention to provide an MPEG-4 encoder using an H.263 multimedia chip, and a method for controlling the same.

In accordance with one aspect of the present invention, the above and other objects can be accomplished by an MPEG-4 encoder using an H.263 multimedia chip, comprising: a DCT (Discrete Cosine Transform) unit for performing a DCT process on source image data entered in frame units; a quantizer for quantizing the DCT-processed image frame using a quantization value of the H.263 multimedia chip; a DC (Direct Current) predictor for predicting a DC component of the quantized image frame using a prescribed MPEG-4 quantization value; a VLC (Variable Length Coding) unit for performing a VLC process on the image frame upon receiving a resultant value of the DC predictor, and outputting an MPEG-4 bit stream; an inverse quantizer (IQ) for dequantizing the quantized image frame using the quantization value of the H.263 multimedia chip; an IDCT (Inverse Discrete Cosine Transform) unit for performing an IDCT process on the dequantized image frame; an H.263 reconstruction image memory for storing an H.263 reconstruction image received from the IDCT unit; an MPEG-4 reconstruction image memory for converting the H.263 reconstruction image into an MPEG-4 reconstruction image, and storing the MPEG-4 reconstruction image; and a motion compensator for comparing a newly-entered next frame with the MPEG-4 reconstruction image stored in the MPEG-4 reconstruction image memory, and removing temporal redundancy according to the result of the comparison.

In accordance with another aspect of the present invention, there is provided an MPEG-4 encoding method, comprising the steps of: a) removing spatial redundancy from source image data entered in frame units using a prescribed H.263 quantization value; b) predicting a DC component of an image frame having no spatial redundancy using a prescribed MPEG-4 quantization value; c) performing a VLC (Variable Length Coding) process on the image frame using the predicted DC component, and outputting the VLC-processed image frame in the form of an MPEG-4 bit stream; d) reconstructing the image frame having no spatial redundancy, and storing the reconstructed image frame; e) converting the reconstructed image frame into an MPEG-4 frame, and storing the MPEG-4 frame; and f) comparing the image frame stored at step (e) with a newly-entered next frame, and removing temporal redundancy according to the result of the comparison.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
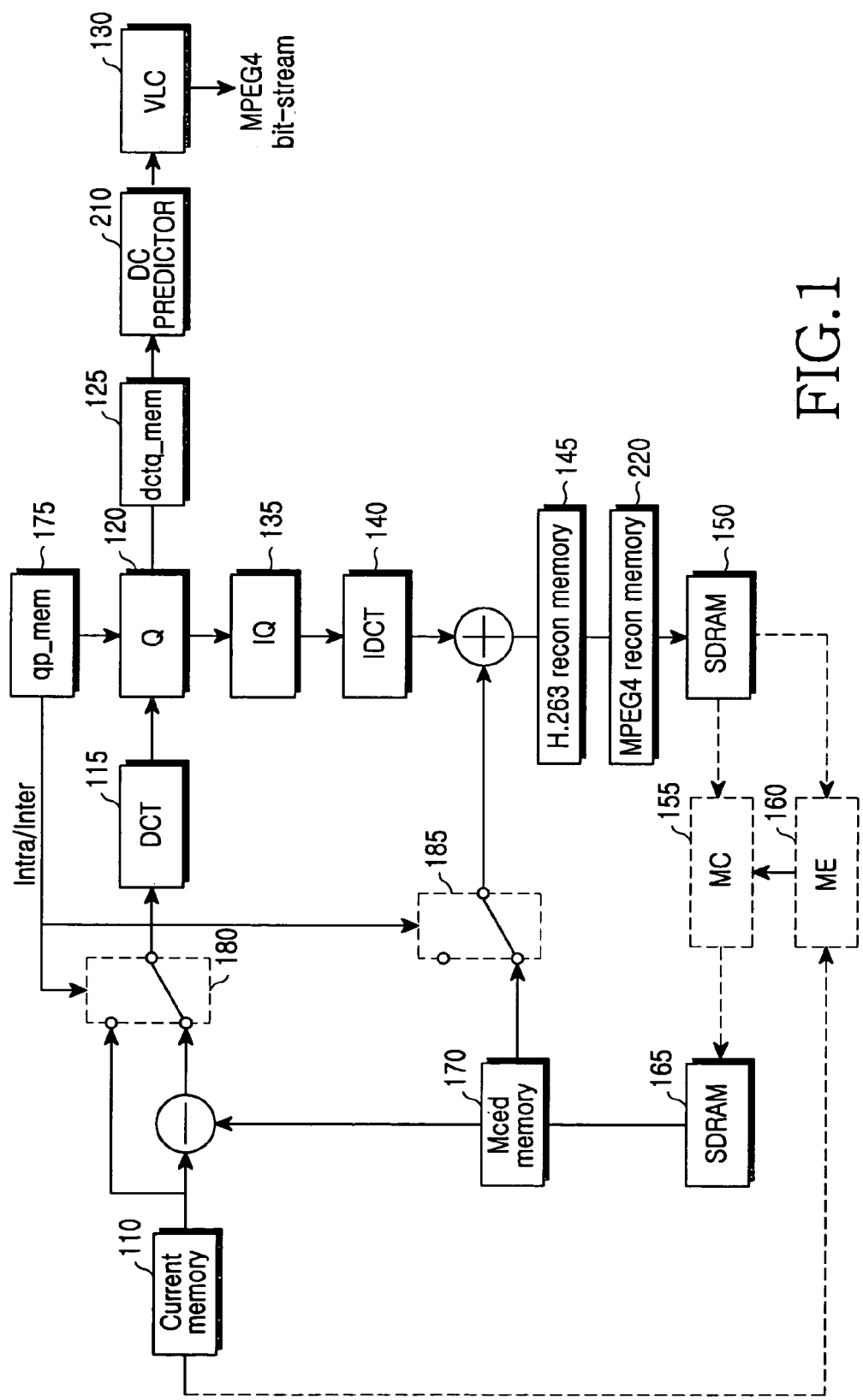
FIG. 1 is a block diagram of an MPEG-4 encoder in accordance with a preferred embodiment of the present invention.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a block diagram of an MPEG-4 encoder in accordance with a preferred embodiment of the present invention. Referring to FIG. 1, the MPEG-4 encoder includes a DCT (Discrete Cosine Transform) unit 115, a quantizer 120, an IQ (Inverse Quantizer) 135, an IDCT (Inverse Discrete Cosine Transform) 140, and a DC predictor 210.

The MPEG-4 encoder receives video data in frame units, encodes a first frame of the received video data using an intra frame coding scheme, and encodes frames from a second frame using the encoding result and an inter frame coding scheme. The MPEG-4 encoder is operated in an intra mode and an inter mode, and contains mode conversion switches 180 and 185. The mode conversion switches 180 and 185 change an operation mode of the MPEG-4 encoder to another mode upon receiving a control signal generated from a prescribed memory "qp_mem" 175 storing operation mode control information of the MPEG-4 encoder.

Referring to FIG. 1, the DCT unit 115 performs a DCT process on source image data received in frame units. The DCT unit 115 receives an image frame from a current memory 110 temporarily storing the frame-units source image data, and performs a DCT process on the received image frame. In case of performing such a DCT process, video data contained in a spatial area where values from 0 to 255 are evenly distributed is divided into a DC (Direct Current) frequency coefficient having a very high absolute value and an AC (Alternating Current) frequency coefficient rapidly reduced in proportion to a frequency value higher than that of the DC frequency coefficient.

The quantizer "Q" 120 quantizes a DCT-processed image frame using a quantization value of the H.263 multimedia chip. That is, a frame DCT-processed by the DCT unit 115 is composed of DCT coefficients, and a division process is performed on the frame using a quantization value of the H.263 multimedia chip, such that a quantization process for converting the frame into lower values and more '0' values is performed. The quantized image frame is clearly classified into a zero coefficient and a non-zero coefficient. If the image frame is DCT-processed and quantized as stated above, spatial redundancy contained in the image frame is removed.

A signal quantized by the quantizer "Q" 120 is temporarily stored in a temporary memory dctq_mem 125, and is transferred to a DC predictor 210. The DC predictor 210 predicts a DC component of the quantized image frame using a prescribed MPEG-4 quantization value (i.e., a DC_scaler). A method for controlling the DC predictor 210 to predict a DC component of an image frame will hereinafter be described with reference to FIGS. 2A~2C.

The MPEG-4 quantization value (i.e., DC_scaler) used for performing such DC prediction is shown in the following Table 1.

TABLE 1

Quantization values for the MPEG-4

| Component Type | DC_scaler for quantizer_scale range | | | |
|---|---|---|---|---|
| | 1~4 | 5~8 | 9~24 | 25=< |
| Luminance | 8 | 2*quantizer_scale | quantizer_scale + 8 | 2*quantizer_scale-16 |
| Chrominance | 8 | | (quantizer_scale + 13)/2 | quantizer_scale-6 |

The VLC (Variable Length Coder) 130 performs a VLC process on the image frame according to a resultant value of the DC predictor 210, and outputs an MPEG-4 bit stream. If the MPEG-4 encoder is operated in an intra mode, the VLC 130 outputs an intra frame. If the MPEG-4 encoder is operated in an inter mode, the VLC 130 outputs an inter frame.

An IQ (Inverse Quantizer) 135 receives the quantized image frame from the quantizer Q 120, and dequantizes the received quantized image frame. The IQ 135 needs a prescribed quantization value to dequantize the image frame. In this case, the prescribed quantization value is equal to that of the quantizer Q 120.

The IDCT unit 140 performs an IDCT process on the dequantized image frame.

If the output signal of the quantizer Q 120 is applied to the IQ 135 and the IDCT 140, then the resulting output restores video data of the spatial area (i.e., spatial video data).

The H.263 reconstruction image memory (i.e., an H.263 recon memory) 145 stores the spatial video data therein. The H.263 reconstruction image memory 145 stores an H.263 reconstruction image created from the IDCT 140.

The MPEG-4 reconstruction image memory 220 converts the H.263 reconstruction image stored in the H.263 reconstruction image memory 145 into an MPEG-4 reconstruction image. In this case, the MPEG-4 reconstruction image memory 220 determines a resultant value of "predetermined H.263 DC component coefficient $(DC_{h263}) \times$H.263 quantization value $(Q_{h263})$–MPEG-4 DC component coefficient $(DC_{mpeg4}) \times$MPEG-4 quantization value $(Q_{mpeg4})$" to be an image conversion constant A. The MPEG-4 reconstruction image memory 220 converts the H.263 reconstruction image $(RECON_{h263})$ into an MPEG-4 reconstruction image $(RECON_{mpeg4})$ using the image conversion constant A. A method for controlling the MEPG-4 reconstruction image memory 220 to convert the H.263 reconstruction image $(RECON_{h263})$ into the MPEG-4 reconstruction image $(RECON_{mpeg4})$ is shown in Equation 1 below.

$$RECON_{mpeg4} = RECON_{h263} - A$$

$$A = DC_{h263} * Q_{h263} - DC_{mpeg4} * Q_{mpeg4} \quad \text{[Equation 1]}$$

Referring to the above Equation 1, the MPEG-4 reconstruction image $(RECON_{mpeg4})$ is created by subtracting the image conversion constant A from the H.263 reconstruction image $(RECON_{h263})$.

The MPEG-4 reconstruction image $(RECON_{mpeg4})$ stored in the MPEG-4 reconstruction image memory 220 is applied to a SDRAM (Synchronous Dynamic Random Access Memory) 150, and is then applied to an ME (Motion Estimator) 160. The ME 160 performs motion estimation according to a comparison result between the MPEG-4 reconstruction image RECON$_{mpeg4}$ and a newly entered next frame.

The MC (Motion Compensator) 155 compensates for the motion of a corresponding frame according to the resultant value of the ME 160, and stores the MC-processed result in the SDRAM 165. The MC-processed result stored in the SDRAM 165 is applied to a prescribed memory "Mced Memory" 170 when the MPEG-4 decoder is operated in an inter mode, such that it is adapted as a reference frame for removing the spatial and temporal redundancies.

Figure 2A:
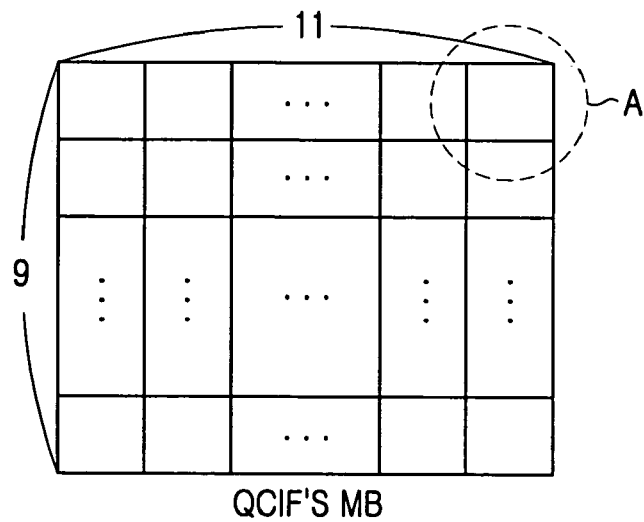
FIGS. 2A~2C are conceptual diagrams for performing DC prediction of the MPEG-4 encoder in accordance with a preferred embodiment of the present invention.
Figure 2B:
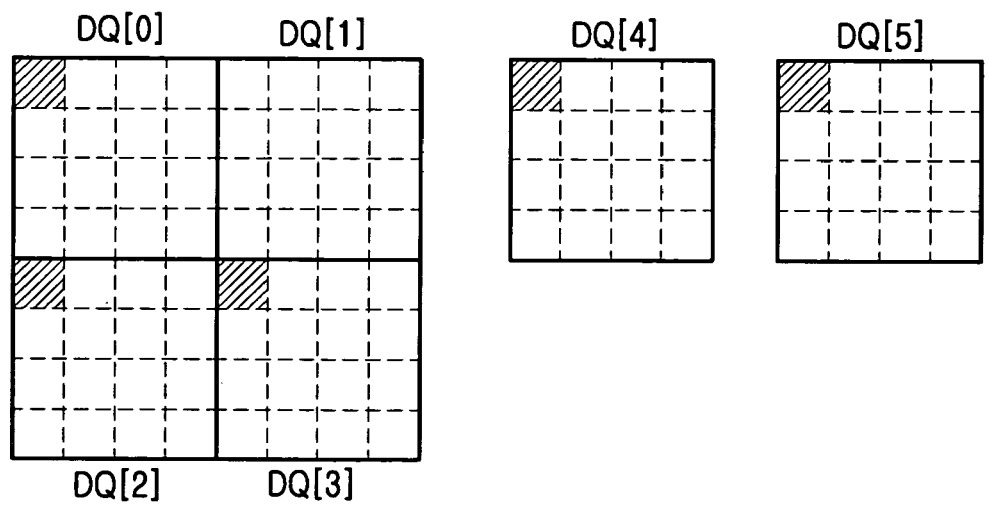
Figure 2C:
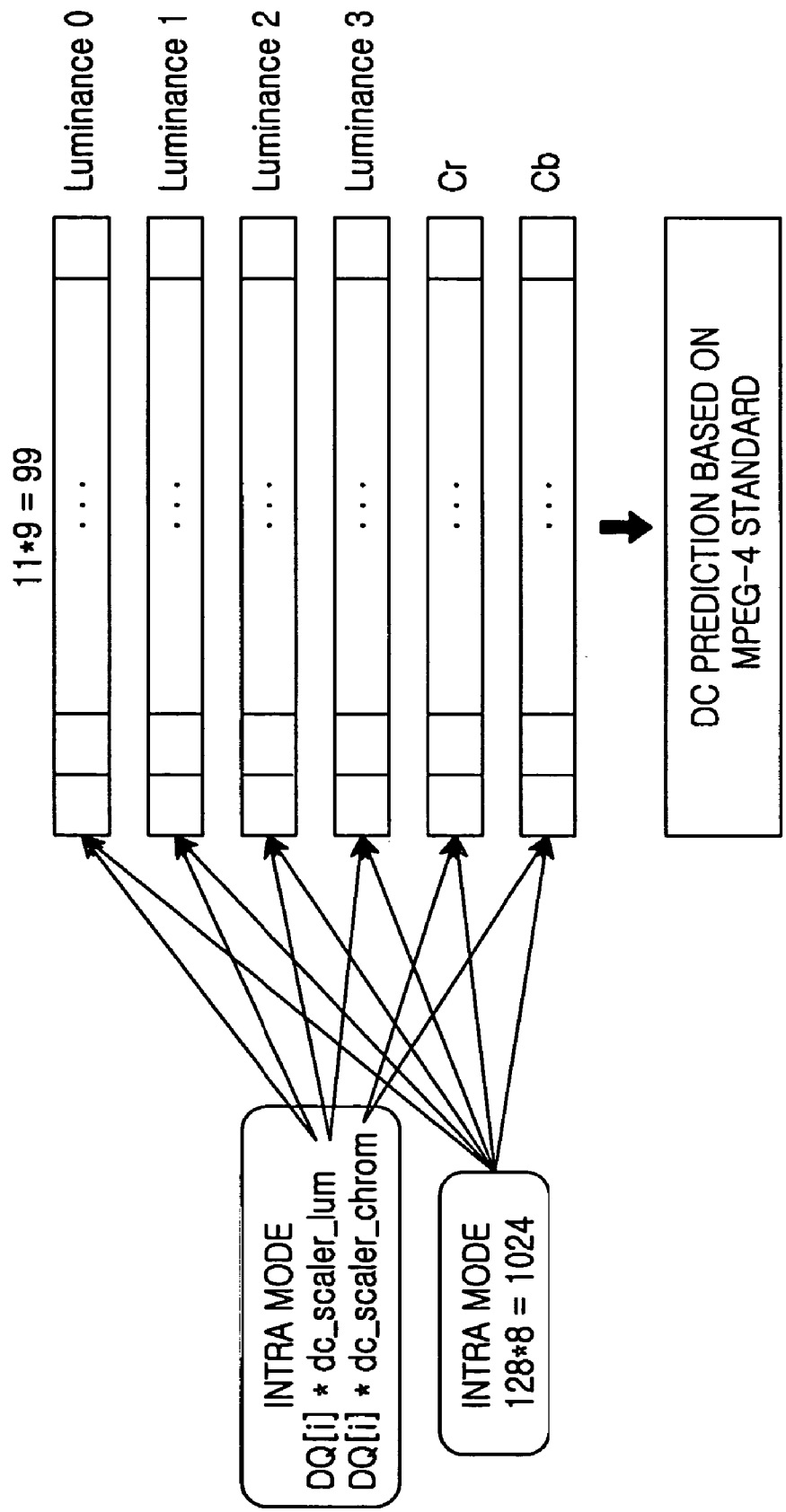

FIGS. 2A~2C are conceptual diagrams for performing DC prediction of the MPEG-4 encoder in accordance with a preferred embodiment of the present invention. Further, examples of a QCIF (Quarter Common Intermediate Format) image configuration having 99 MBs (Micro Blocks) are illustrated in FIGS. 2A~2C. More particularly, a configuration example of one MB from among 99 MBs is illustrated in FIG. 2B. In this case, the QCIF image is configured in the form of video data used for a videoconference, and an image frame generated from the quantizer Q 120 is configured in the form of a QCIF image format.

Referring to FIG. 2B, each MB contains six 4×4 blocks. Each 4×4 block includes four luminance blocks DQ[0], DQ[1], DQ[2] and DQ[3], and two chrominance blocks DQ[4] and DQ[5]. Oblique-lined areas of the six blocks DQ[0] to DQ[6] each indicate a DC component of a DCT domain.

FIG. 2C illustrates an array configuration for storing DC prediction values associated with the QCIF image.

The DC predictor 210 illustrated in FIG. 1 contains 6 arrays each having 99 storage areas in order to store such a DC prediction value associated with the QCIF image composed of 99 MBs each having six 8×8 blocks. Six arrays are comprised of a plurality of arrays (Luminance 0~Luminance 3) for storing DC prediction values of four luminance blocks contained in each MB, and two arrays (cr, cb) for storing DC prediction values of two chrominance blocks. Although FIG. 2C illustrates an example of six 1×99 one-dimensional arrays, it should be noted that the above arrays can also be implemented with a 6×99 two-dimensional array.

The DC predictor 210 having the above configurations performs DC prediction on the received image frame according to an MPEG-4 standard.

Figure 3:
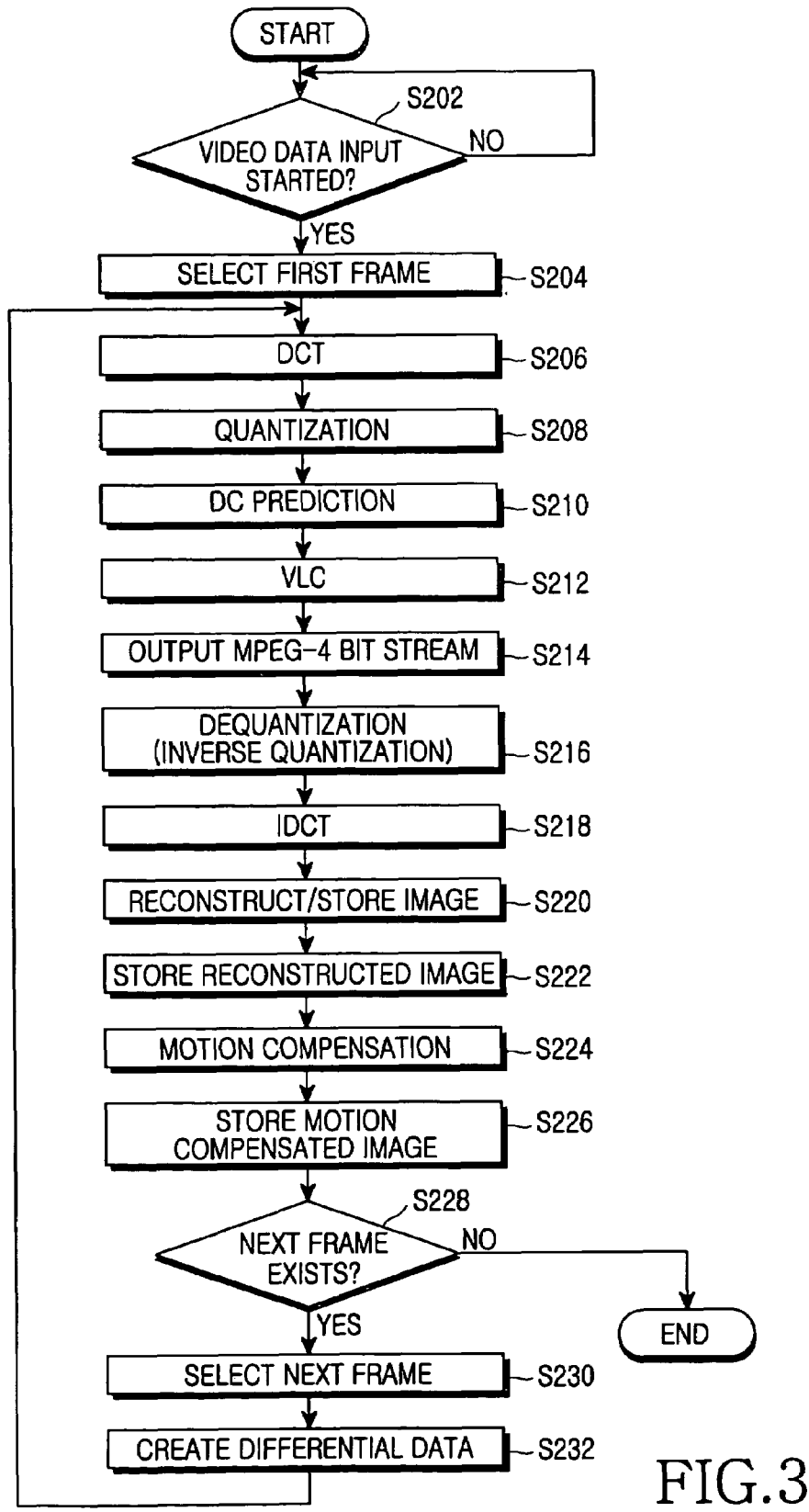
FIG. 3 is a flow chart illustrating an encoding method of the MPEG-4 encoder in accordance with a preferred embodiment of the present invention.

FIG. 3 is a flow chart illustrating an encoding method of the MPEG-4 encoder in accordance with a preferred embodiment of the present invention. Referring to FIG. 3, upon receiving frame-unit video data from an external part at step S202, the MPEG-4 encoder selects a first image frame at step S204, and performs a prescribed process for removing spatial redundancy from the selected first image frame. In more detail, the MPEG-4 encoder performs a DCT process on the selected image frame at step S206, and quantizes the DCT-processed image frame at step S208.

If the spatial redundancy of the received image frame is removed at steps S206 and S208, a DC component of the image frame having no spatial redundancy is predicted at step S210, and a VLC process of the image frame is performed using the predicted DC component at step S212, such that the MPEG-4 encoder outputs a resultant MPEG-4 bit stream at step S214. The MPEG-4 encoder predicts a DC component of the image frame having no spatial redundancy using a prescribed MPEG-4 quantization value at step S210. In this case, the MPEG-4 bit stream created with the first image frame is an intra frame.

The MPEG-4 encoder reconstructs an image frame having no spatial redundancy in order to remove temporal redundancy associated with entry frames from the first image frame. In more detail, the MPEG-4 encoder dequantizes the image frame quantized at step S208 at step S216, and performs an IDCT process on the dequantized image frame at step S218. Then, the reconstructed image is stored at step S220.

In this case, because the reconstructed image is created according to the H.263 standard, the reconstructed image is converted and stored at step S222. More specifically, the image frame reconstructed in the form of spatial video data and stored at step S220 is converted into an MPEG-4 image frame, and is stored at step S222.

The MPEG-4 encoder compares the image frame stored at step S222 with a newly-entered next frame, performs a motion compensation process according to the result of the comparison between the stored image frame and the newly-entered next frame at step S224, and stores the motion-compensated image frame at step S226. In this case, it should be noted that the motion compensation process contains a motion estimation process.

If the next frame at step 230 is entered, the MPEG-4 encoder creates the image frame stored at step S226 along with differential data of the next frame at step S232, and performs the aforementioned MPEG-4 encoding steps S206 to S226 using the differential data. In conclusion, the MPEG-4 encoder removes temporal redundancy from an image frame entered since the first image frame upon receipt of a difference between the image frame itself and a previous image frame, and then removes spatial redundancy from the image frame.

Because detailed explanations of the aforementioned steps S206 to S226 have already been described in FIG. 1, they will not be described again for the convenience of description.

As is apparent from the above description, the present invention implements an MPEG-4 encoder and a method for controlling the same using a typical H.263 multimedia chip, such that the an MPEG-4 encoding process is made available without increasing a production cost. The present invention implements a hardware-based MPEG-4 encoder, resulting in an increased encoding speed of a camcorder phone storing a moving image. In more detail, the MPEG-4 encoder according to the present invention has an MPEG-4 encoding speed, which is at least two-times faster than that of a software-based MPEG-4 encoder such as a camcorder phone using the typical H.263 multimedia chip, resulting in an improved performance of the camcorder phone.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. An MPEG-4 encoding method, comprising the steps of:
   a) removing spatial redundancy from source image data entered in frame units using a prescribed H.263 quantization value;
   b) predicting a DC component of an image frame having no spatial redundancy using a prescribed MPEG-4 quantization value;
   c) performing a VLC (Variable Length Coding) process on the image frame using the predicted DC component, and outputting the VLC-processed image frame in the form of an MPEG-4 bit stream;
   d) reconstructing the image frame having no spatial redundancy, and storing the reconstructed image frame;

e) converting the reconstructed image frame into an MPEG-4 frame, and storing the MPEG-4 frame;

f) comparing the MPEG-4 frame stored at step (e) with a newly entered next frame, and removing temporal redundancy according to a result of the comparison; and g) determining by an MPEG-4 reconstruction image memory a resultant value of predetermined H.263 DC component coefficient×H.263 quantization value−MPEG-4 DC component coefficient×MPEG-4 quantization value to be an image conversion constant, and converts an H.263 reconstruction image into an MPEG-4 reconstruction image using the image conversion constant.

2. An MPEG-4 encoder apparatus utilizing an H.263 multimedia chip, comprising:

a DCT (Discrete Cosine Transform) unit for performing a DCT process on source image data entered in frame units;

a quantizer for quantizing the DCT-processed image frame using a quantization value of the H.263 multimedia chip;

a DC (Direct Current) predictor for predicting a DC component of the quantized image frame using a prescribed MPEG-4 quantization value;

a VLC (Variable Length Coding) unit for performing a VLC process on the image frame upon receiving a resultant value of the DC predictor, and outputting an MPEG-4 bit stream;

an inverse quantizer (IQ) for dequantizing the quantized image frame using the quantization value of the H.263 multimedia chip;

an IDCT (Inverse Discrete Cosine Transform) unit for performing an IDCT process on the dequantized image frame;

an H.263 reconstruction image memory for storing an H.263 reconstruction image received from the IDCT unit;

an MPEG-4 reconstruction image memory for converting the H.263 reconstruction image into an MPEG-4 reconstruction image, and storing the MPEG-4 reconstruction image, wherein the MPEG-4 reconstruction image memory determines a resultant value of predetermine H.263 DC component coefficient×H.263 quantization value−MPEG-4 DC component coefficient×MPEG-4 reconstruction image using the image conversion constant, and converts the H.263 reconstruction image into an MPEG-4 reconstruction image using the image conversion constant; and a motion compensator for comparing a newly-entered next frame with the MPEG-4 reconstruction image stored in the MPEG-4 reconstruction image memory, and removing temporal redundancy according to a result of the comparison.

3. The apparatus as set forth in claim 2, wherein the DC predictor predicts and stores a DC component of an image frame comprised of N micro blocks each having L luminance blocks and M chrominance blocks, and includes L+M one-dimensional arrays each having N storage areas so as to separately store individual DC components of the luminance blocks and the chrominance blocks.

4. The apparatus as set forth in claim 2, wherein the DC predictor predicts and stores a DC component of an image frame comprised of N micro blocks each having L luminance blocks and M chrominance blocks, and includes (L+M)*N two-dimensional arrays each having N storage areas so as to separately store individual DC components of the luminance blocks and the chrominance blocks.

* * * * *